United States Patent [19]

Biberg

[11] 4,044,566
[45] Aug. 30, 1977

[54] MACHINE FOR FORMING TRENCHES FOR PIPELINES OR THE LIKE IN THE SEA BED

[76] Inventor: Odd Bjørn Biberg, Bronnveien 7, Oslo 2, Norway

[21] Appl. No.: 606,227

[22] Filed: Aug. 20, 1975

[30] Foreign Application Priority Data

Aug. 28, 1974 Norway ................................. 743088

[51] Int. Cl.$^2$ ............................ E02F 5/02; F16L 1/00
[52] U.S. Cl. .................................................... 61/72.4
[58] Field of Search ........................ 61/72.4, 72.1, 69; 37/58

[56] References Cited

U.S. PATENT DOCUMENTS

| 3,004,392 | 10/1961 | Symmank | 61/72.4 |
| 3,717,003 | 2/1973 | Bates et al. | 61/72.4 |
| 3,732,701 | 5/1973 | Lynch | 71/72.4 |
| 3,877,237 | 4/1975 | Norman | 61/72.4 |

Primary Examiner—Paul R. Gilliam
Assistant Examiner—David H. Corbin
Attorney, Agent, or Firm—Holman & Stern

[57] ABSTRACT

A trenching machine comprising a carriage, a trenching unit, operating machinery and buoyancy tanks; the carriage has wheels and is guided on the pipeline so as to permit swinging of the carriage around the pipeline; the carriage is also driven along the pipeline by engagement of the wheels with the pipeline; the trenching unit is rigidly connected to the major inert masses of the machine including the buoyancy tanks, whereas the carriage is carried by said major masses by vertical, hydraulic cylinders.

5 Claims, 3 Drawing Figures

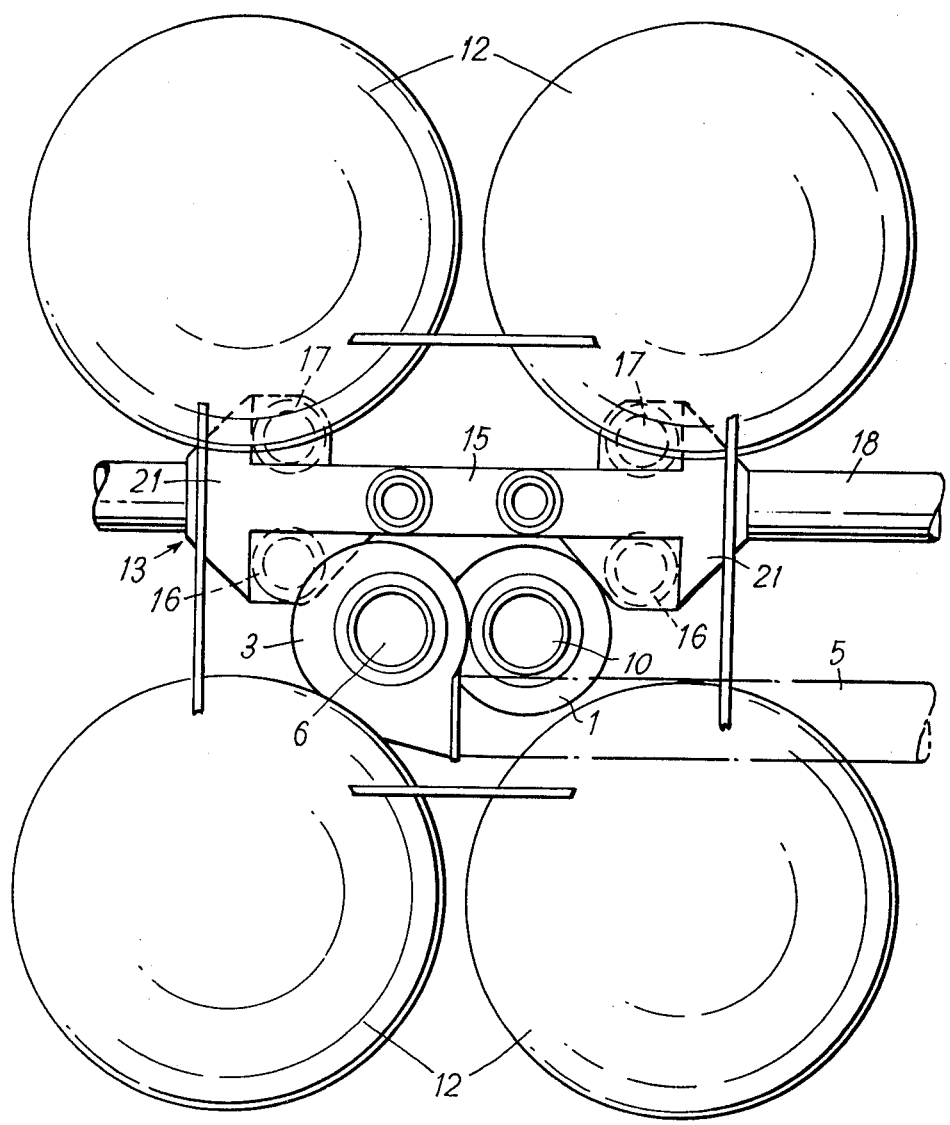

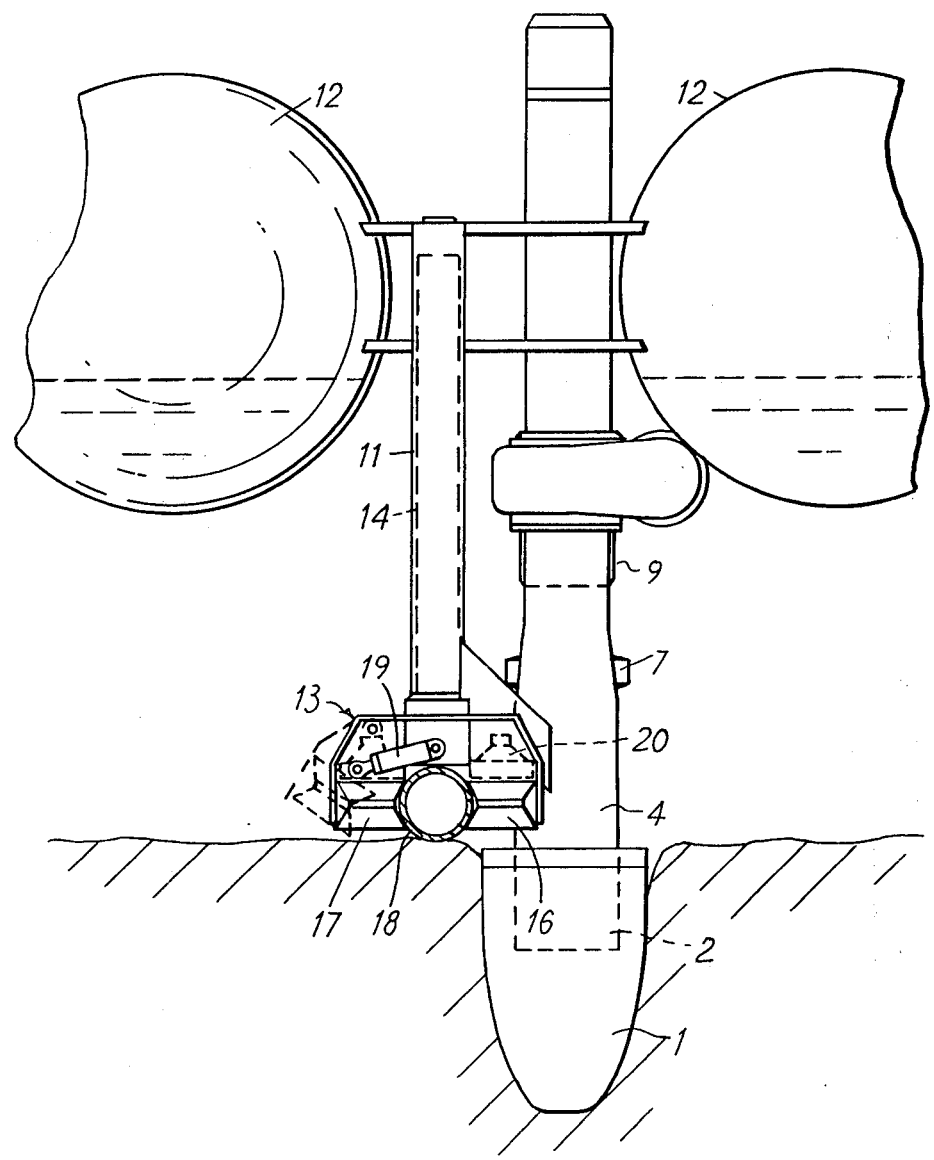

MACHINE FOR FORMING TRENCHES FOR PIPELINES OR THE LIKE IN THE SEA BED

FIELD OF THE INVENTION

The present invention relates to a machine for forming trenches for pipelines, cables or the like in the sea bed.

BACKGROUND OF THE INVENTION

A number of various types of such trenching machines are known, however, for forming trenches in great depths, only machines which do not have to be hauled from the surface, but have a propulsion system of their own come into consideration. Also, the power supply must take place through electric cables to the trenching machine on the sea bed, where the electric power is transformed to mechanical energy by means of electric motors, the movement of which is transmitted to propelling and trenching means by hydraulic pumps and motors. As a consequence of the electric and hydraulic pumps and motors, the machine will have a considerable weight. Because of the tremendous amount of energy (electrical power) necessary, units using a mechanical breaking up of the mass to be excavated, must be employed in trenching machines for use in great depths, whereas the removal of broken masses in admixture with water may take place by suction; such trenching units employing a suction removal of the loosened masses are generally known; see, for example, U.S. Pat. No. 3,717,003 to Bates, et al. In the patent to Bates, et al, mentioned above, there is disclosed apparatus which is guided along a cable or pipeline, however, the entire weight of the apparatus is imposed on the pipeline or cable as a trench is being formed therealong.

The machine described in the two last-mentioned U.S. patent specifications also have buoyancy tanks reducing the load on the pipeline and maintaining a stable position of the machine relative to a horizontal plane.

SUMMARY OF THE INVENTION

Specifically, the machine of the present invention is of the type comprising a carriage having wheels, belts or the like, said carriage being guided on the pipeline so as to permit swinging of the carriage around the pipeline, and being driven along the pipeline by engagement of the wheels or the like with the pipeline, a trenching unit; means for operating said unit, electric current supply cables to the machine from the surface, and buoyancy tanks carrying the major part of the weight of the machine.

The object of the invention is to provide in a machine of this type requiring very little space on the bottom of the sea, a maneuverability which permits the cutter head of the trenching unit to be adjusted to a number of different positions with respect to the pipeline or the like, said positions being stable in spite of the fact that the machine is not secured against rotation about the pipeline and the fact that trenching units on both sides of the pipeline are not required.

The machine of the invention is characterized in that the trenching unit is rigidly connected to the major inert masses of the machine including the buoyancy tanks, said major masses in turn carrying the propulsive guiding carriage in a manner permitting vertical movement of the carriage relative to said major masses. In this manner, a very large mass of inertia is obtained which may take up reaction forces and dampen vibrations caused by the trenching unit and maintain a chosen oblique position even if there is only one trenching unit instead of pairs of such units rotating in different directions and mutually stabilizing the machine. Since only one trenching unit is required, it will be easier to release the machine from the pipeline in case of emergency without damaging the pipeline. In this manner a machine is obtained which is not supported on the sea bed and in which forces to which the machine is subjected during the trenching are transferred to the pipeline. The machine will follow the pipeline very closely, but nevertheless possesses the required freedom of movement relatively thereto, so that the desired trenching track may be obtained. For instance, if an unexpected obstruction is met during the trenching operation, the machine may be driven a distance in reverse along the pipeline in order subsequently to be advanced while being progressively tilted to obtain a somewhat diverging track past the difficult spot. The tilting is controlled by the buoyancy tanks, and the large inert masses of the machine allows it to take up tilting reaction forces and maintain a rather stable tilting position although it is not restricted by the pipeline from rotation thereabout.

The buoyancy tanks are so dimensioned that the weight of the machine is in all substantial respects carried by the ballast tanks and only to a small degree, if at all, by the pipeline via the carriage. In spite of the fact that all the mechanical equipment is positioned on the machine, which accordingly has a considerable weight, it thereby becomes possible to relieve the pipeline of this weight. Thereby, the strength of the pipeline may instead be used for absorbing the force from the cutter head and other forces to which the machine is subjected during the trenching operation, at the same time making it possible to drive the machine along the pipeline also along stretches over which the pipeline extends in a free span. Supporting the machine on the pipeline only and not on the sea bed also implies that the machine requires very little space on the bottom laterally of the pipeline so that it may be used on an uneven sea bed where only limited free space is available laterally of the pipeline.

The trenching unit preferably comprises a cutter head provided with a sludge suction conduit, a hydraulic motor for the cutter head, a sludge pump provided with a suction pipe and an outlet pipe, and an electric motor for operating the sludge pump. Additionally, the machine may carry electric motors for operating hydraulic pumps and possibly means for stabilizing the machine and adjusting it when seating it on the pipeline on the sea bed.

Further features and objects of the invention will appear from the subsequent description, reference being had to the drawing which illustrates an embodiment of a trenching machine according to the invention.

BRIEF DESCRIPTION OF THE DRAWINGS

FIG. 2 is a top plan view of FIG. 1; and

FIG. 3 is an end elevational view looking from left to right at FIG. 1.

DETAILED DESCRIPTION OF THE PREFERRED EMBODIMENT

Figure 1:
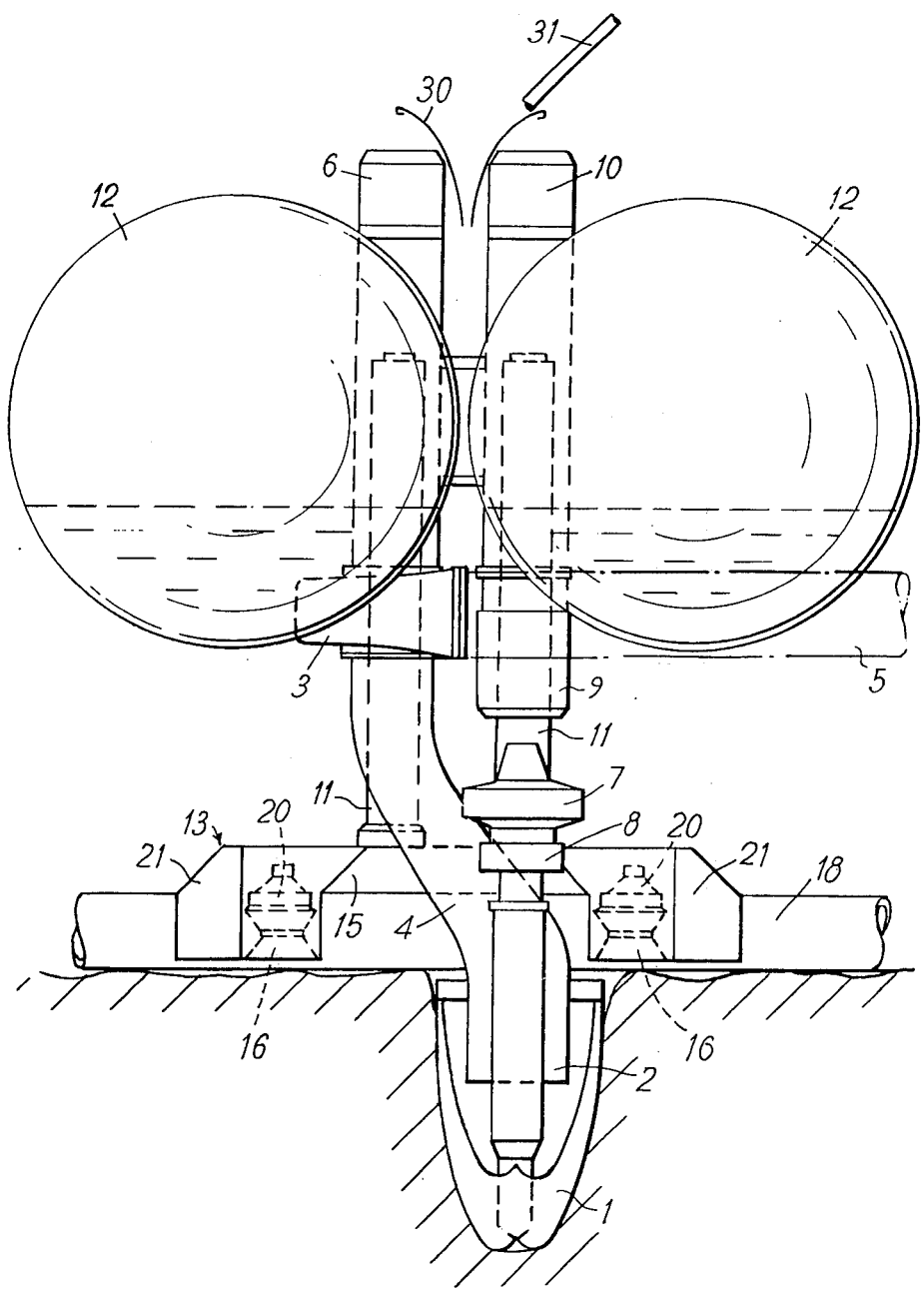
FIG. 1 is a side elevational view, essentially diagrammatic, and showing the novel trenching machine in relation to a fragmentary portion of a sea bed and pipeline.

The trenching machine illustrated in the drawing comprises a trenching head 1 having a central sludge suction conduit 2, a sludge pump 3 provided with a suction pipe 4 and an outlet pipe 5, an electric motor 6 for operating the sludge pump 3, a hydraulic motor 7 including a gear transmission 8 for operating the cutter head 1, a hydraulic pump 9 for supplying hydraulic pressure fluid to the hydraulic motor 7 and an electric motor 10 for operating the pump 9. All these elements are interconnected in a suitable manner to a rigid connected structure which additionally comprises two vertical guide cylinders 11 positioned laterally of the trenching head 1 and four buoyancy and ballast tanks 12 arranged in pairs on each side of the cutter head 1 and the two guide cylinders 11. The guide cylinders 11 permit relative vertical movement between the elements of the machine described so far and a guiding and propulsive carriage 13 having two upright columns 14 telescopically guided in one each of the vertical guide cylinders 11. The columns 14 and the cylinders 11 may be designed as doubleacting hydraulic cylinders for moving the carriage 13 relative to the remainder of the machine by means of hydraulic pressure fluid from the pump 9.

The carriage 13 is shaped as an elongated beam 15 which at each end carries a pair of wheels 16, 17 having vertical axes of rotation. The wheels 16 and 17 have a V-shaped profile, and the wheels of each pair are urged towards each other around the pipeline 18 which is to be buried and along which the trenching machine is to be moved. The wheels 16 on the side of the pipeline 18 adjacent the cutter head 1 are stationary mounted in the carriage 13. However, the wheels 17 are adjustable by means of hydraulic cylinders 19. These cylinders urge the wheels 17 with a constant force against the pipeline 18, which may be somewhat non-uniform. Additionally, the cylinders 19 permit the wheels in each pair to be moved apart so that the carriage may be seated on the pipeline 18.

Because each wheel 16 and 17 has a V-shaped profile or rather consists of two parts, each having the form of a truncated cone, the wheel will contact the pipeline at two points. The wheels are provided with rubber or plastic covered treads for better engagement with the pipeline. Further, each of the wheels is provided with its own hydraulic motor 20, which is mounted coaxially with the wheel concerned and is driven by hydraulic fluid from the pump 9. Each pair of wheels is surrounded by a plough-shaped shield 21 providing a narrow slot at the lower end of the wheel and towards the pipeline 18. Water under pressure may be supplied to this shield so that an outward flow of water is generated in the slots to keep the wheel treads clean. The plough shape of the shields makes it easier for the carriage 13 to penetrate loose masses when driven along a partly buried pipeline 18.

The clamping force between the wheels 16, 17 and the pipeline 18 provided by the cylinders 19 maintain the machine steadily on the pipeline 18 and transmits all forces on the machine to the pipeline while at the same time providing a sufficient friction between the wheels and the pipeline to obtain the necessary tractive force for driving the carriage and thus the trenching machine along the pipeline. The hydraulic motors 20 are reversible, so that the machine may be driven in both directions on the pipeline.

The ballast and buoyancy tanks 12 contain some ballast water, but are for the rest dimensioned so as to provide a considerable buoyancy to relieve the pipeline 18 from the weight of the machine. The amount of ballast water and, accordingly, the buoyancy are adjusted by pumping from the surrounding water. In order to facilitate this pumping and simplify the structure of the tanks the latter are preferably put under a gas pressure approximately corresponding to the pressure on the depth at which the machine is to be used. The centre of gravity of the gas volumes lies above the centre of gravity of the machine and the water ballast, so that a stable position of the machine in the water is obtained.

It will be seen that the structure of the carriage enables it to rotate about the pipeline 18. However, since the wheels 16 and 17 must be safely clamped on the pipeline 18, they should roll on the circumference of the pipeline 18 if the carriage (and accordingly the entire trenching machine) is rotated about the pipeline, meaning that the carriage should at the same time move along the pipeline 18 with the wheels 16 and 17 accordingly moving along helices thereon. The movement required to rotate the machine about the pipeline is provided by pumping ballast water between the ballast tanks. During this operation the amount of ballast remains constant, and although deformations caused by pressure differences in the ballast tanks may somewhat affect the total buoyancy, the change will be insignificant. Apart from the amount of ballast pumped, the moment obtained depends on the distance between the tanks, and the obtained tilting of the machine depends on the level of the tanks above the centre of gravity of the machine. By laterally moving ballast in a machine as illustrated in the drawing, there may be obtained a tilting angle of the machine relative to the vertical of about 30° to either side. When the carriage is clamped on the pipeline it cannot be tilted in a vertical plane through the axis of the pipeline, but by moving ballast forwards or backwards the carriage of a machine as illustrated in the drawing may exert a moment of about 80 000 Nm on the pipeline in the said vertical plane. When the machine is not clamped on the pipeline it may be adjusted up to 20° in either direction in a vertical plane through the longitudinal axis of the carriage. Thereby, the carriage may be adjusted parallel with the pipeline before the machine is seated thereon. Lateral tilting of the machine permits the forming of trenches having various positions relative to the pipeline 18. Because the cutter head 1 is positioned laterally of the pipeline 18 trenches may be formed also on the opposite side of the pipeline by reversing the machine thereon. If obstructions are encountered in the chosen track of the trench, the machine may be driven a distance rearwardly along the pipeline, whereupon it may again be advanced while simultaneously swinging the trenching unit about the pipeline so that the cutter head will move along a somewhat diverging track.

The embodiment illustrated in the drawing may, of course, be subjected to a number of modifications. For instance, the carriage 13 may have more than four wheels or it may be provided with belts. Further, to effect the relative vertical movement between the carriage 13 and the remainder of the machine there may be provided other guides and moving mechanisms which at the same time prevent twisting of the carriage relatively to the machine. As an example, instead of two vertical columns 11 only one column having a guide groove may be used. Alternatively, the mobility may be ensured by means of linkage mechanisms, for instance two toggle joints positioned in the vertical plane through the axis of the pipeline.

The mutual mobility in the vertical direction is necessary for the cutter head 1 firstly not to protrude unduly and thereby be in the way when the carriage is to be seated on the pipeline 18, and secondly to be movable into the sea bed for forming a trench when the carriage 13 is clamped on the pipeline.

The machine is launched from a mother ship. It may for instance be lowered through the water suspended in the load wire of a winch providing a constant force. During this operation a buoy having an electric cable drum may be seated in a docking port which is schematically indicated at 30 and is provided at the upper end of the machine (FIG. 1). After lowering to a depth of about 50 meter the drum buoy may be released and remain on this depth, whereas the machine is lowered further onto the sea bed, the cable being unwound. During the lowering operation the machine may be controlled by means of thrusters provided in pairs at each end of the carriage 13. The thrusters in each pair may form an angle of 90° with each other and each form an angle of 45° with the vertical plane. When the machine approaches the sea bed the machine is levelled and positioned above the pipeline with the carriage 13 in its lower position relatively to the remainder of the machine. The wheels 17 are moved away from the wheels 16 so that the wheel system is open to receive the pipeline. When the carriage has obtained its position on the pipeline it is clamped thereon. The cutter head and the sludge pump are started and the carriage 13 is retracted in the machine, meaning that the cutter head 1 works its way into the sea bed. The propulsive means is started and the trench is cut alongside the pipeline. Especially during the cutting of the first part of the trench it may be advantageous to undercut the pipeline somewhat until it falls into the trench. This is achieved by laterally tilting the machine as described above.

The machine is driven from an operating desk on the mother ship. From this position the loads on the cutter head, the pump and the wheel system are supervised for optimal trenching. During operation the machine is given a small positive buoyancy. The masses from the sludge pump may be deposited to the side of the machine or rearwardly to fill the trench.

In an emergency situation accumulated oil pressure may relieve the wheel system etc. Simple control handles for manually actuating the wheel system to release the machine if the oil system fails, may be operated from a miniature sub-marine. Divers should be unnecessary for operating the machine.

During raising the cable is wound and the buoy is docked in the machine, which may subsequently be hauled up to the mother ship.

Said cable buoy effects the desired tensioning and guiding of the electric cable supplying electric currency to the electric motors, said cable being indicated at 31 in FIG. 1. However, such a cable buoy is by no means required. The cable drum is then positioned on the mother ship. the cable may be freely suspended from the mother ship down to the machine, to the cable buoy or to an ordinary floating buoy, and may, if desired, be provided with buoyancy elements for carrying the weight of the cable to prevent the cable from being subjected to undue stresses. Further, the machine may be released from the loading wire as soon as it has been launched, since the machine may be given a sufficient buoyancy to float on the sea. In that case lowering and raising of the machine may take place by adjusting the buoyancy, i.e. by means of the amount of ballast in the ballast and buoyancy tanks 12.

In addition to the thrusters referred to the machine may be provided with smaller electric motors for driving the wheels 16, 17 and electronic equipment for positioning and surveyance. This equipment is not shown. The same is true for any oil pressure accumulators which may be provided in order to ensure sufficient oil pressure for all the hydraulic motors or cylinders under all circumstances.

What I claim is:

1. In underseas trenching apparatus for forming trenches for pipelines and the like in the sea bed, comprising a releasably-engaging carriage having motive means for releasable engagement on the pipeline and movement along and in an arc around the longitudinal axis of the pipeline, means for driving said motive means along the pipeline by engagement of the motive means with the pipeline, a trenching unit on said apparatus, and projecting beyond the carriage, power means on said apparatus for operating said trenching unit and said means for driving said motive means, said trenching unit and power means comprising a major part of the weight of the apparatus, buoyancy tanks on the apparatus for supporting a major part of the weight of the apparatus, the improvement in which said trenching unit and said power means are integrally-connected to said buoyancy tanks for simultaneous movement therewith, means connecting said carriage to said trenching unit and said power means for causing the same to move along with the carriage on the pipeline and around said pipeline, said means connecting comprising means permitting relative vertical movement between said carriage and said major part of the weight of said apparatus so that a major part of the weight is not imposed on said pipeline, means connecting said bouyancy tanks to each other for altering their bouyancy in relation to the longitudinal axis of the pipeline and said carriage for causing the trenching unit to be adjusted in an arc about the pipeline upon which the carriage is supported and relieving the major part of the weight from off the pipeline.

2. In the underseas trenching apparatus as set forth in claim 1, pump means on said apparatus connected to said bouyancy tanks for pumping ballast therebetween and causing the apparatus and trenching unit to be adjusted in an arc about the longitudinal axis of the pipeline upon which the apparatus is guided.

3. In the underseas trenching apparatus as claimed in claim 1, in which said cooperating portions on said carriage and said assembly comprising two vertical columns on said carriage telescopically-received and guided by portions of said assembly.

4. In the underseas trenching apparatus as claimed in claim 1, in which said trenching unit comprises a cutter head including a sludge-suction conduit, a hydraulic motor for the cutter head, a sludge pump including a suction pipe and an outlet pipe, and an electrically-powered motor means connected to and for operating the sludge pump.

5. In the underseas trenching apparatus as claimed in claim 1, in which said apparatus includes an electrically-powered motor connected to a hydraulic pump connected to a sludge pump adjacent said trenching unit, and said bouyancy tanks being disposed in offset relationship relative to said carriage and including means for adjusting the relative bouyancy effect thereof for stabilizing and adjusting the attitude of the apparatus, carriage and trenching unit.

* * * * *